United States Patent [19]

Ukihashi et al.

[11] 4,255,523

[45] * Mar. 10, 1981

[54] CATION EXCHANGE MEMBRANE OF FLUORINATED POLYMER FOR ELECTROLYSIS AND PREPARATION THEREOF

[75] Inventors: Hiroshi Ukihashi, Tokyo; Tatsuro Asawa; Tomoki Gunjima, both of Yokohama, all of Japan

[73] Assignee: Asahi Glass Company, Limited, Tokyo, Japan

[ * ] Notice: The portion of the term of this patent subsequent to Aug. 19, 1997, has been disclaimed.

[21] Appl. No.: 902,759

[22] Filed: May 3, 1978

[30] Foreign Application Priority Data

Jun. 3, 1977 [JP] Japan ................................. 52/64900
Nov. 1, 1977 [JP] Japan ................................. 52/130288
Feb. 10, 1978 [JP] Japan ................................. 53/13560

[51] Int. Cl.³ ............................................. C08J 5/22
[52] U.S. Cl. ..................................... 521/27; 204/296; 428/421

[58] Field of Search ..................... 260/2.2 R; 204/296; 428/421; 521/27

[56] References Cited

U.S. PATENT DOCUMENTS

| | | | |
|---|---|---|---|
| 3,853,720 | 12/1974 | Korach et al. ..................... | 204/296 |
| 4,065,366 | 12/1977 | Odo et al. ......................... | 204/296 |

FOREIGN PATENT DOCUMENTS

| | | | |
|---|---|---|---|
| 2630584 | 1/1977 | Fed. Rep. of Germany ........... | 204/296 |
| 50-120492 | 9/1975 | Japan ..................................... | 204/296 |
| 51-46589 | 4/1976 | Japan ..................................... | 204/296 |
| 52-24176 | 2/1977 | Japan ................................. | 260/2.2 R |
| 52-24177 | 2/1977 | Japan ................................. | 260/2.2 R |

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A cation exchange membrane of a fluorinated polymer is formed by incorporating fibrils of polytetrafluoroethylene into a cation exchange resin of a fluorinated polymer having carboxylic acid groups or functional groups which can be converted to carboxylic acid groups.

11 Claims, No Drawings

CATION EXCHANGE MEMBRANE OF FLUORINATED POLYMER FOR ELECTROLYSIS AND PREPARATION THEREOF

BACKGROUND OF THE INVENTION

1. Field of the Invention

The present invention relates to a cation exchange membrane of a fluorinated polymer for electrolysis. More particularly, it relates to a cation exchange membrane of a fluorinated polymer having excellent electrochemical properties and mechanical properties which is suitable as a membrane for electrolysis of an aqueous solution of an alkali metal chloride.

2. Description of the Prior Art

Recently, it has been proposed to use a cation exchange membrane for electrolytic production of an alkali metal hydroxide and chlorine in high purity instead of a conventional asbestos diaphragm.

It has been known that a membrane of a fluorinated polymer has desirable characteristics as the cation exchange membrane because of the requirements of oxidation resistance, chlorine resistance, alkaline resistance and heat resistance.

The cation exchange membranes made of a copolymer of a fluorinated olefin and a fluorinated monomer having a sulfonic acid group or a functional group which can be converted to a sulfonic acid group such as the copolymer of $CF_2=CF_2$ and $CF_2=CFOCF_2CF(CF_3)O(CF_2)_2SO_2F$ or a copolymer of a fluorinated olefin and a fluorinated monomer having a carboxylic acid group or a functional group which can be converted to carboxylic acid group such as the copolymer of $CF_2=CF_2$ and $CF_2=CFO(CF_2)_3COOCH_3$ and the copolymer of $CF_2=CF_2$ and $CF_2=CFOCF_2CF(CF_3)O(CF_2)_3COOCH_3$ have been known as membranes having good electrolytic characteristics.

The latter type of cation exchange membranes prepared from the fluorinated polymer having carboxylic acid groups as the cation exchange groups has been considered to be superior to the former type of cation exchange membranes prepared from the fluorinated polymer having sulfonic acid groups as the cation exchange groups when used as the cation exchange membrane for electrolysis because the electrolysis can be performed at high current efficiency with low electrolytic voltage by using the latter even if an alkali metal hydroxide having high concentration is produced.

For example, an alkali metal hydroxide having a concentration higher than 40 wt. % can be produced in at a current efficiency higher than 90% by the electrolysis of an alkali metal chloride using said cation exchange membrane having carboxylic acid groups.

However, when the cation exchange membrane of the fluorinated polymer having carboxylic acid groups as the cation exchange groups is used for the electrolysis, there is a disadvantage of weak strength against various mechanical shocks occurring during the electrolysis though it has excellent electrochemical characteristics.

The cation exchange membrane contacts an alkali metal hydroxide in high concentration on one side and contacts an alkali metal chloride on the other side in the electrolysis. Moreover, the different pressures of the different gases are respectively applied to the membrane, whereby the phenomena of partial swelling and contraction of the membrane are caused. Furthermore, hardening of the membrane in ageing may occur whereby the creases, cracks and laminal peeling of the membrane may be caused to form pin holes which cause leakage of the raw material of alkali metal chloride into the alkali metal hydroxide and a decrease of the current efficiency.

Heretofore, in order to improve the mechanical strength of the cation exchange membrane, it has been known to reinforce the membrane by disposing a reinforcing material such as fabric or non-woven fabric of polypropylene, polyvinyl chloride, polyvinylidene fluoride, or polytetrafluoroethylene in the membrane.

In this way, the dimensional stability of the membrane is improved; however the strength against the severe mechanical shocks encountered during the electrolysis is not satisfactorily improved.

In said reinforcement, the electric characteristics such as the increase of electric resistance of the cation exchange membrane are deteriorated and the reinforcing material is expensive.

SUMMARY OF THE INVENTION

It is an object of the present invention to provide a cation exchange membrane of fluorinated polymer for electrolysis which has excellent mechanical properties being durable against the shocks encountered during electrolysis, without deteriorating the electric characteristics, and which can be prepared at low cost.

It is an another object of the present invention to provide an effective and economical process for preparing a cation exchange membrane of fluorinated polymer as described above.

The foregoing and other objects of the present invention have been attained by providing a cation exchange membrane of a fluorinated polymer in which fibrils of polytetrafluoroethylene are incorporated into the fluorinated polymer having carboxylic acid groups or functional groups which can be converted to carboxylic acid groups as the cation exchange resin in the form of a membrane.

DETAILED DESCRIPTION OF THE PREFERRED EMBODIMENTS

In accordance with the present invention, the cation exchange membrane of a fluorinated polymer having high strength against various mechanical shocks which cause the formation of pin holes during the electrolysis can be obtained without deteriorating the significant characteristics of the cation exchange membrane of the fluorinated polymer having carboxylic acid groups as the cation exchange groups in the electrolysis of an alkali metal chloride and rather with improvement of certain characteristics such as the electric resistance.

The inventors have found that the strength of the membrane for preventing the formation of the creases, cracks and laminal peeling during the electrolysis is closely connected with the flexural strength (folding endurance) and the breaking elongation of the membrane rather than the tear strength reinforced with the conventional fabric. The inventors have further found that the flexural strength and the breaking elongation of the cation exchange membrane of a fluorinated polymer having carboxylic acid groups are remarkably improved by the blending of fibrils of polytetrafluoroethylene in comparison with cation exchange membranes of a fluorinated polymer having sulfonic acid groups.

As described above, the amount of the fibrils of polytetrafluoroethylene incorporated into the fluorinated polymer having carboxylic acid groups is an important consideration in attaining the objects of the present invention.

When the amount of the fibrils is not suitable, the unpredictable phenomenon of the formation of various foams in the membrane during a long operation of the electrolysis is caused.

The mechanical strength of the membrane having the foams is decreased at the foamed parts whereby creases, cracks and pin holes are easily formed at the foamed parts and the electrical characteristics of the membrane are also deteriorated.

The inventors have found that a membrane having the desired characteristics could be obtained by incorporating the fibrils of polytetrafluoroethylene in a small ratio of 0.5 to 4.0 wt. % of the total of the fibrils and the cation exchange resin of the fluorinated polymer, which is unpredictable from the viewpoint of the reinforcement of the membrane.

The mechanical strength of the membrane can be improved as desired for the membrane used for the electrolysis even though the amount of the fibrils is unpredictably small.

Since the amount of the fibrils of polytetrafluoroethylene can be small to attain the object of the invention, a higher melt fluidity can be obtained in the fabrication of the cation exchange membrane to give superior fabricatability into the membrane.

The present invention will be further illustrated in detail.

The fibrils of polytetrafluoroethylene incorporated in the cation exchange resin can be prepared by using polytetrafluoroethylenes which can be formed into fibrils of three dimensional network structure of branches or spider web by applying shear stress to the polymer.

The polytetrafluoroethylenes can be fine powders obtained by emulsion polymerization or molding powders obtained by suspension polymerization.

It is preferable to use particles of polytetrafluoroethylene having a specific surface area of 3 to 30 m$^2$/g preferably 6 to 20 m$^2$/g and a primary particle diameter of less than 5μ preferably 3 to 0.03μ and a secondary particle diameter of less than 5 mm preferably less than 3 mm.

The polytetrafluoroethylene can be in the form of powder formed by pulverizing, at low temperature, the molding powder obtained by the suspension polymerization of tetrafluoroethylene. However, it is optimum to use the fine powder obtained by the emulsion polymerization of tetrafluoroethylene to give said characteristics.

The fine powder can be obtained by an emulsion polymerization of tetrafluoroethylene in an aqueous medium by the conventional method.

In the present invention, the aqueous emulsion of polytetrafluoroethylene and the fine powder obtained by coagulation of the aqueous emulsion can be used for forming the fibrils.

The polytetrafluoroethylenes can be homopolymers of tetrafluoroethylene as well as copolymers of $CF_2=CF_2$ and comonomer

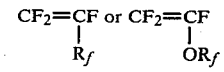

wherein $R_f$ represents a $C_1$–$C_{10}$ perfluoroalkyl group; or a comonomer $CF_2=CFCl$ etc. at a ratio of less than 5 mole % of the comonomer units.

The molecular weight of the polytetrafluoroethylene used in the present invention is not critical and it is preferably more than 2,000,000 from the viewpoint of the properties of the obtained membrane.

As described above, the amount of the fibrils of polytetrafluoroethylene is an important factor and it is preferably in the range of 0.5 to 4.0 wt. % especially 1.0 to 2.8 wt. % of the total of the fibrils and the cation exchange resin. When the amount of the fibrils is too small, the effect for improving the mechanical strength is not great enough whereas when the amount of the fibrils is too great, the formation of foam in the electrolysis and difficulty of fabrication into the membrane are disadvantageously caused.

The fibrils of polytetrafluoroethylene can be incorporated into the cation exchange resin by various methods.

From the viewpoints of fabricatability, economy and the characteristics of the resulting cation exchange membrane, it is preferable to mix the polytetrafluoroethylene with the cation exchange resin while applying shear stress to the mixture at the time of mixing or after the mixing to form the fibrils of polytetrafluoroethylene.

The fibrils are formed by applying shear stress to the polytetrafluoroethylene by kneading the mixture of the polytetrafluoroethylene and the cation exchange resin with a roll mill.

In the formation of the fibrils, the convention methods for blending or kneading of plastics such as kneading in a two roll mill, kneading in a Banbury mixer, kneading in an uniaxial or biaxial extruder can be employed.

In the operation, the shear stress is preferably higher than $10^5$ dyn/cm$^2$ and the shear velocity is preferably higher than 0.1 sec$^{-1}$ and the temperature is preferably higher than 70° C. especially higher than 100° C. and lower than the melting point of the polytetrafluoroethylene and the time is not critical and preferably in a range of 1 minute to 1 hour.

The mixing of the polytetrafluoroethylene and the cation exchange resin can be carried out at the time of forming the fibrils of the polytetrafluoroethylene. The mixture of the polytetrafluoroethylene and the cation exchange resin in a dry blend or a wet blend can be kneaded on a two roll mill to form the fibrils of the polytetrafluoroethylene.

From the viewpoint of the electrochemical characteristics of the membrane, the ion exchange capacity of the cation exchange resin used in the present invention is preferably in a range of 0.5 to 2.5, especially 1.0 to 2.0 meq/g.dry polymer. When the molecular weight is shown by the temperature ($T_Q$) to give a volumetric melt flow rate of 100 mm$^3$/sec., it is preferably in a range of 130° to 350° C. especially 160° to 300° C. from the viewpoints of the electrochemical and mechanical characteristics.

The copolymers having the following units (a) and (b) are preferably used as the fluorinated cation exchange resins for the cation exchange membrane of the present invention.

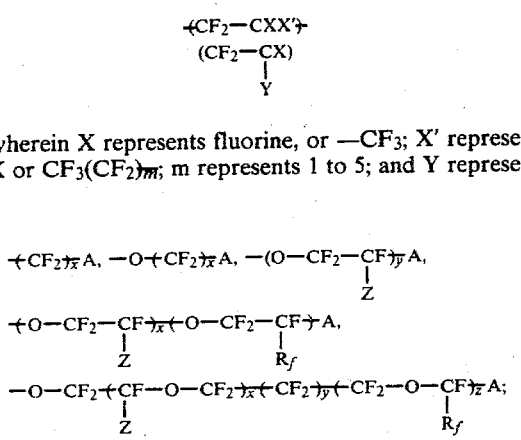

wherein X represents fluorine, or —CF$_3$; X' represents X or CF$_3$(CF$_2$)$_m$; m represents 1 to 5; and Y represents wherein x, y and z respectively represent 1 to 10; Z and R$_f$ respectively represent —F or a C$_1$-C$_{10}$ perfluoroalkyl group; A represents —COOH or a functional group which can be converted to —COOH by hydrolysis or neutralization such as —CN, —COF or —COOR wherein R represents a C$_1$-C$_{10}$ alkyl group.

The copolymer having the units of (a) and (b) preferably contains the units (b) at a ratio of 5 to 40 mole % so as to give the above-mentioned ion exchange capacity to the membrane.

The ion exchange group the fluorinated cation exchange resin which is mixed with the polytetrafluoroethylene is preferably —COOH, —CN or —COOR wherein R represents a C$_1$-C$_{10}$ alkyl group from the viewpoints of easy fabricatability and less thermal decomposition in the formation of the fibrils of the polytetrafluoroethylene.

In the production of the fluorinated copolymers used as the cation exchange resin, the membrane can be modified by using one or more of said monomers or by copolymerizing the other monomer. For example, flexibility is imparted to the resulting membrane by using CF$_2$=CFOR$_f$ wherein R$_f$ represents a C$_1$-C$_{10}$ perfluoroalkyl group or the mechanical strength of the membrane is increased by partially crosslinking with a small amount of a divinyl monomer such as CF$_2$=CF—CF=CF$_2$ or CF$_2$=CFO(CF$_2$)$_{1-4}$OCF=CF$_2$ so as to impart the above-mentioned volumetric melt flow to the resulting copolymer.

The copolymerization of a fluorinated olefin and a comonomer having a carboxylic acid group or a functional group which can be converted to a carboxylic acid group, and optionally the other monomer, can be carried out by a catalytic polymerization, a thermal polymerization or a radiation-induced polymerization, optionally by using solvents such as halohydrocarbons, in a suitable polymerization system such as solution polymerization, emulsion polymerization or suspension polymerization.

The resulting copolymer is mixed with the polytetrafluoroethylene and the fibrils of the polytetrafluoroethylene are formed.

The following three processes are typical processes for fabrication of the mixture of the polytetrafluoroethylene and the cation exchange resin into a membrane.

(1) The polytetrafluoroethylene is mixed with the cation exchange resin and the formation of the fibrils of the polytetrafluoroethylene and the fabrication of the cation exchange resin into a membrane are continuously carried out by using an extruder or a calender molding machine.

(2) The mixing and the formation of the fibrils are carried out by using a kneading roll and the mixture of the cation exchange resin and the fibrils of the polytetrafluoroethylene is extruded by an extruder to fabricate the membrane.

(3) The mixing, the formation of the fibrils and the fabrication of the membrane are separately carried out.

In the fabrication of the membrane, the calendering method, the T-die extruding method, the inflation extruding method, the pressmolding method or the powder molding method can be employed.

The resulting cation exchange membrane of the present invention has a structure which is satisfactorily reinforced. Accordingly, it is not necessary to further reinforce a membrane with the conventional reinforcing material. However, it is possible to further improve the mechanical characteristics by supporting the membrane on a conventional reinforcing material such as a fabric of cloth or net or a non-woven fabric. It is also possible to eliminate inner strain by heating the membrane at a temperature lower than the melting point of the polytetrafluoroethylene.

The functional groups of the resulting cation exchange membrane are optionally converted to carboxylic acid groups or ammonium salts or alkali metal salts of the carboxylic acid groups by a hydrolysis etc.

The process for producing the alkali metal hydroxide and chlorine by electrolysis of an aqueous solution of an alkali metal chloride can be the conventional process, for example, the electrolysis is carried out at a cell voltage of 2.3 to 5.5 volts and a current density of 10 to 100 A/dm$^2$. The anode used in the electrolysis can be graphite or an anticorrosive electrode having dimensional stability which is made of a titanium substrate coated with a platinum group metal or an oxide of a platinum group metal. The electrolyte cell system can be a unipolar or multipolar type.

Thus, in the case of the two compartment cell the anode compartment and the cathode compartment are formed by partitioning the anode and the cathode with the cation exchange membrane of the fluorinated polymer of the present invention and an aqueous solution of an alkali metal chloride is fed into the anode compartment and water or dilute aqueous solution of alkali metal chloride is fed into the cathode compartment. For example, sodium hydroxide having high concentration such as 20 to 45% can be obtained by electrolyzing an aqueous solution of sodium chloride having a concentration of 2.5 to 4.5 N at 80° to 120° C. at a current density of 10 to 50 A /dm$^2$.

A further understanding can be obtained by reference to certain specific examples which are provided herein for purposes of illustration only and are not intended to be limiting unless otherwise specified.

In the examples, the ion exchange capacity of the cation exchange membrane is measured as follows.

A cation exchange membrane is immersed into 1N—HCl at 60° C. for 5 hours to completely convert it to an H-type membrane, and then, the membrane is washed with water to free it from HCl. Then, 0.5 g of the H-type membrane is immersed into a solution prepared by adding 25 ml of water to 25 ml of 0.1 N— NaOH to completely convert it to a Na$^+$ type membrane and then, the membrane is taken out and the amount of NaOH in the solution is measured by a back titration with 0.1 N—HCl.

The tear strength of the membrane is measured as the tearing strength in the direction of extruding the polymer into the membrane, pursuant to the method of Japanese Industrial Standard Z1702 (1962).

The flexural strength (folding endurance) is measured by a tester manufactured by Toyo Seiki K. K. pursuant to the method of Japanese Industrial Standard P8115 by using samples having a width of 1.5 cm, a thickness of $300\mu$ and a length of 14 cm using a weight of 1.5 Kg, an angle of 135° and a rotation of 100 r.p.m. The result is shown as number of times of the bending until the membrane breaks.

The wear resistance is measured by the taper wearing test pursuant to Japanese Industrial Standard K7204 wherein the cation exchange membrane having functional groups of —COONa is washed with water and dried for 24 hours in air and the test is carried out at 25° C. using a wearing wheel of 1,000 g and a friction of 1000 times.

The edge bursting strength is measured by disposing a tack having a needle of a diameter of 2.9 mm and a length of 3 mm on the rubber plate of a bursting strength tester manufactured by Toyo Seiki K. K. and disposing the $Na^+$ type cation exchange membrane on the needle and applying the pressure to the rubber plate pursuant to the bursting test of Japanese Industrial Standard 8112 to find the pressure ($Kg/cm^2$) at which the membrane is broken by the needle of the tack.

The specific surface area is measured by the nitrogen gas adsorption method at low temperature.

The volumetric melt flow rate is measured by extruding 1 g of a sample through a nozzle having a diameter of 1 mm and a length of 2 mm under a pressure of 30 $Kg/cm^2$ by a flow tester.

The particle size of the sample is measured by observation by a scanning type electron microscope.

EXAMPLE 1

In a 10 liter stainless steel autoclave equipped with a baffle, 5,000 g of deionized water, 2.5 g of disuccinic acid peroxide, 7.5 g of ammonium perfluorooctanoate and 300 g of paraffin wax (melting point of 56° to 58° C.) were charged and the gases were purged and tetrafluoroethylene was introduced to a pressure of 2 $Kg/cm^2$ (gauge) and the autoclave was heated with stirring. When the content was heated to 65° C., tetrafluoroethylene was further fed to raise the pressure to about 26 $Kg/cm^2$ (gauge) in the vessel.

The autoclave was heated to 80° C. and the temperature was maintained. The pressure in the vessel increased at the beginning depending upon the decrease of solubility caused by the rise of the temperature, however it decreased depending upon the consumption of the monomer by the initiation of the polymerization.

Tetrafluoroethylene was fed so as to maintain the pressure of 27 $Kg/cm^2$ (gauge) in the vessel. When 2.7 Kg of tetrafluoroethylene was attained, the feed of the monomer and the stirring were stopped and the unreacted monomer was discharged from the autoclave to stop the polymerization.

The resulting latex containing 35 wt. % of polytetrafluoroethylene was diluted with deionized water to 3 times the volume and the polytetrafluoroethylene was coagulated with stirring at high speed; it was then granulated, washed with water and dried to obtain a fine powder of polytetrafluoroethylene having a specific surface area of 8.5 $m^2/g$ and a secondary particle diameter of $630\mu$.

On the other hand, a copolymer of $CF_2=CF_2$ and $CF_2=CF-O(CF_2)_3COOCH_3$ having an average particle diameter of 1 mm and an ion exchange capacity of 1.45 meq/g polymer and $T_Q$ (temperature for a volumetric melt flow rate of 100 $mm^3/sec.$) of 235° C. was dispersed in carbon tetrachloride. The dispersion was stirred at 1,400 r.p.m. and the polytetrafluoroethylene was added so as to give four compositions A, B, C and D shown in Table 1.

Each of the mixtures was dried to remove carbon-tetrachloride and was kneaded on a two roll mill having a length of 8 inches using a roll gap of 2 mm, a temperature of 135° C., a roll speed of 14 r.p.m. and 20 r.p.m. for 10 minutes to form fibrils of polytetrafluoroethylene. The mass of the mixture of the copolymer and the fibrils of polytetrafluoroethylene was cut into pellets and the pellets were extruded by an extruder having an inner diameter of barrel of 20 mm to form a membrane having a thickness of $280\mu$.

The membrane was treated in 25% NaOH at 90° C. for 16 hours to convert the ion exchange groups from —COOCH$_3$ to —COONa whereby a cation exchange membrane used as a membrane for an alkali electrolysis was obtained.

The mechanical characteristics and the electrochemical characteristics of the membrane in the electrolysis of an aqueous solution of sodium chloride are shown in Table 1.

The conditions for the electrolysis of an aqueous solution of sodium chloride were as follows.

The cation exchange membrane (effective area of 25 $cm^2$) was disposed between a platinum anode and an iron cathode. The electrolysis was carried out by feeding 4.5 N—NaCl aqueous solution at a rate of 150 ml/hour into the anode compartment and filling the cathode compartment with 8N—NaOH aqueous solution at the beginning and then, feeding water into the cathode compartment so as to obtain 40 wt. % NaOH aqueous solution in the normal state at 90° C. with a current of 5A and a current density of 20 A. $dm^2$ for 30 days.

As controls, the mechanical and electrochemical characteristics of the following cation exchange membranes: (Reference E) a cation exchange membrane of a fluorinated polymer which was prepared by the same process except eliminating the fibrils of polytetrafluoroethylene; (Reference F) a cation exchange membrane of a fluorinated polymer reinforced with a woven fabric of polytetrafluoroethylene yarns (50 mesh, 200 denier) instead of the fibrils of polytetrafluoroethylene; and (Reference G) a cation exchange membrane of a fluorinated polymer containing 6 wt. % of the fibrils of polytetrafluoroethylene, are also shown in Table 1.

TABLE 1

|  | Example | | | | Reference | | |
| --- | --- | --- | --- | --- | --- | --- | --- |
|  | A | B | C | D | E | F | G |
| Fibrils of polytetrafluoro- | 1.0 | 2.0 | 2.5 | 3.7 | 0 | 0 | 6.0 |

TABLE 1-continued

|  | Example | | | | Reference | | |
|---|---|---|---|---|---|---|---|
|  | A | B | C | D | E | F | G |
| ethylene (wt.%) | | | | | | | |
| Tear strength (Kg/cm$^2$) | 2.6 | 4.0 | 5.5 | 7.2 | 2.0 | 35 | 8.2 |
| Flexural strength (times) | 70 | 100 | 160 | 450 | 30 | 50 | 2000 |
| Wearing test (mg) | 30 | 26 | 22 | 22 | 48 | 40 | 18 |
| Edge bursting strength(Kg/cm$^2$) | 2.9 | 2.9 | 3.5 | 3.7 | 0.8 | — | 4.2 |
| NaOH current efficiency for production of 40% NaOH (%) | 96 | 96 | 96 | 96 | 96 | 96 | 96 |
| Cell voltage (volt) | 3.7 | 3.7 | 3.7 | 3.7 | 3.7 | 3.9 | 3.7 |
| Condition of membrane after electrolysis for 30 days | None | None | None | Foam 1 | None | None | Foam 2 |

Note:
None: No change was found.
Foam 1: One foam having a diameter of 0.1 mm was formed in the membrane.
Foam 2: Four foams having diameter of 0.1 to 0.2 mm were formed in the membrane.

As is clear from Table 1, the mechanical characteristics of the membranes were significantly improved in the cases containing the fibrils of polytetrafluoroethylene at a ratio of up to 4 wt. %.

When the content of the fibrils is further increased, the effects for improving the mechanical characteristics were not so high except the flexural strength whereas the electrochemical characteristics in the electrolysis were deteriorated.

EXAMPLE 2

In accordance with the process of Example 1 except charging 10 g of ammonium perfluorooctanoate, and feeding hexafluoropropylene at the time of feeding 1.35 Kg of additional tetrafluoroethylene to perform the polymerization of 2.7 Kg of tetrafluoroethylene in the presence of 0.7 mole % of hexafluoropropylene, a fine powder of polytetrafluoroethylene was produced. The resulting fine powder contained about 0.06 wt. % of hexafluoropropene units and had a specific surface area of 8.5 m$^2$/g and a secondary particle diameter of 480μ.

On the other hand, the cation exchange resin of the copolymer of $CF_2$=$CF_2$ and $CF_2$=CF—O—$(CF_2)_3$—COOCH$_3$ used in Example 1 was mixed with 2.7 wt. % of the resulting fine powder of polytetrafluoroethylene and a membrane was fabricated in accordance with the process and tests of Example 1.

The characteristics of the resulting cation exchange membrane are shown in Table 2 wherein the electrochemical characteristics were measured by the method of Example 1.

EXAMPLE 3

In accordance with the process of Example 1 except that the mixture comprised 2.0 wt. % of fine powder of polytetrafluoroethylene having a specific surface area of 9.2 m$^2$/g and a secondary particle diameter of 470μ (Teflon 6AJ:manufactured by Mitsui Fluorochemical K.K.) and a cation exchange resin of a copolymer of $CF_2$=$CF_2$ and $CF_2$=CFOCF$_2$CF(CF$_3$)O(CF$_2$)$_3$COOCH$_3$ having an ion exchange capacity of 1.40 meq/g polymer and $T_Q$ (temperature for a volumetric melt flow rate of 100 mm$^3$/sec.) of 190° C., a membrane was fabricated.

The characteristics of the resulting cation exchange membrane are shown in Table 2 wherein the electrochemical characteristics were measured by the method of Example 1.

EXAMPLE 4

In accordance with the process of Example 1 except that the mixture comprised 2.3 wt. % of a fine powder of polytetrafluoroethylene having a specific surface area of 9.0 m$^2$/g and a secondary particle diameter of 470μ (Teflon 6J: manufactured by Mitsui Fluorochemical K.K.) and a cation exchange resin of a copolymer of $CF_2$=$CF_2$ and (a) $CF_2$=CFO(CF$_2$)$_3$COOCH$_3$ and (b) $CF_2$=CFOCF$_2$CF(CF$_3$)O(CF$_2$)$_3$COOCH$_3$ (molar ratio of (a) to (b) :4/1) having an ion exchange capacity of 1.45 meq/g polymer and $T_Q$ (temperature for volumetric melt flow rate of 100 mm$^2$/sec.) of 220° C., a membrane was fabricated.

The characteristics of the resulting cation exchange membrane are shown in Table 2 wherein the electrochemical characteristics were measured by the method of Example 1.

TABLE 2

|  | Example 2 | Example 3 | Example 4 |
|---|---|---|---|
| Fibrils of polytetrafluoroethylene (wt. %) | 2.7 | 2.1 | 2.3 |
| Tear strength (Kg/cm$^2$) | 5.0 | 4.1 | 5.5 |
| Flexural strength (times) | 130 | 100 | 130 |
| NaOH current efficiency for production of 40% NaOH (%) | 96 | 93 | 95 |
| Cell voltage (volt) | 3.7 | 3.7 | 3.7 |
| Condition of membrane after electrolysis for 150 days | None | None | None |

EXAMPLE 5

A fabric made of polytetrafluoroethylene (50 mesh: 100 denier) was superposed and pressed on each of the methyl ester type membranes of A,B,C,D,E and G in Example 1 at 195° C. under a pressure of 30 Kg/cm$^2$ for 5 minutes by a press machine. The resulting membranes A', B', C', D', E' and G' were respectively treated in accordance with the process of Example 1 to prepare the membranes for electrolysis.

The characteristics of the resulting cation exchange membranes are shown in Table 3 wherein the electrochemical characteristics were measured by the method of Example 1.

|  | Example | | | | Reference | |
|---|---|---|---|---|---|---|
|  | A | B | C | D | E | G |
| Fibrils of polytetrafluoroethylene (wt. %) | 1.0 | 2.0 | 2.5 | 3.7 | 0 | 6.0 |
| Tear strength (extruding direction) (Kg/cm²) | 32 | 33 | 35 | 35 | 31 | 35 |
| Flexural strength (times) | 30 | 60 | 100 | 220 | 20 | 500 |
| NaOH current efficiency for production of 40% NaOH (%) | 96 | 96 | 96 | 96 | 96 | 96 |
| Cell voltage (volt) | 3.7 | 3.7 | 3.7 | 3.7 | 3.7 | 3.7 |
| Condition of membrane after electrolysis for 30 days | None | None | None | Foam 1 | None | Foam 2 |

What is claimed is:

1. A fluorinated polymer cation exchange membrane for electrolysis which comprises a cation exchange resin of a perfluorocarbon polymer having carboxylic acid groups or functional groups which can be converted to carboxylic acid groups said resin having 0.5 to 2.8 wt. % fibrils of polytetrafluoroethylene incorporated therein, wherein said fibrils are formed by applying shear stress to particles of polytetrafluoroethylene.

2. A cation exchange membrane according to claim 1 wherein 1.0 to 2.8 wt. % of the fibrils of polytetrafluoroethylene are incorporated based on the total weight of the fibrils and the cation exchange resin of a fluorinated polymer.

3. A cation exchange membrane according to claim 1 or 2 wherein the cation exchange resin has an ion exchange capacity of 0.5 to 2.5 meq/g dry polymer.

4. A cation exchange membrane according to claim 1 wherein the fluorinated polymer is comprised of 60 to 95 mole % of units (a) $-(CF_2-CXX')-$ and 5 to 40 mole % of units

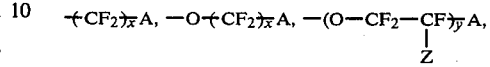

wherein X represents fluorine, or $-CF_3$; X' represents X or $CF_3(CF_2)_m$; m represents 1 to 5; and Y represents

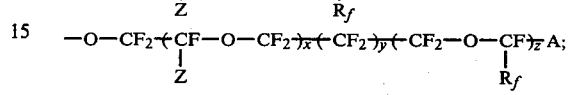

wherein x, y and z respectively represent 1 to 10; Z and $R_f$ respectively represent -F or a $C_1-C_{10}$ perfluoroalkyl group; A represents $-COOH$ or a functional group which can be converted to $-COOH$ by hydrolysis.

5. A cation exchange membrane according to claim 1 or 2 wherein the fibrils of polytetrafluoroethylene are fibrils of polytetrafluoroethylene having a specific surface area of 3 to 30 cm²/g prepared by emulsion polymerization.

6. A cation exchange membrane according to claim 1 or 3 wherein the fibrils of polytetrafluoroethylene are fibrils of a copolymer of tetrafluoroethylene having less than 5 mole % of units of a comonomer having the formula

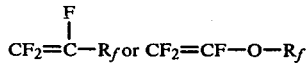

wherein $R_f$ represents a $C_1-C_{10}$ fluoroalkyl group.

7. A process for preparing a cation exchange membrane of a fluorinated polymer for eletrolysis which comprises mixing 0.5 to 2.8 wt. % polytetrafluoroethylene for forming fibrils with a cation exchange resin of the fluorinated polymer having carboxylic acid groups or functional groups which can be converted to carboxylic acid groups; and kneading the mixture in the condition of applying shear stress to form fibrils of polytetrafluoroethylene and fabricating it to a membrane, wherein said membrane comprises from 0.5 to 2.8 wt. % of fibrils.

8. A process according to claim 7 wherein the fibrils of polytetrafluoroethylene are formed at a temperature higher than 100° C. and lower than the melting point of the polytetrafluoroethylene.

9. A process according to claim 7 wherein the polytetrafluoroethylene has a secondary particle diameter of less than 5 mm.

10. A process according to claim 7, 8, or 9 wherein the polytetrafluoroethylene is produced by an emulsion polymerization.

11. A cation exchange membrane according to claim 4 wherein A is selected from the group consisting of $-CN$, $-COF$, and COOR, wherein R represents a $C_1-C_{10}$ alkyl group.

* * * * *

UNITED STATES PATENT AND TRADEMARK OFFICE
CERTIFICATE OF CORRECTION

PATENT NO. : 4,255,523
DATED : March 10, 1981
INVENTOR(S) : UKIHASHI ET AL

It is certified that error appears in the above—identified patent and that said Letters Patent is hereby corrected as shown below:

On the title page delete the second and third Priority data to read as follows:

[30]--Foreign Application Priority Data

Jun. 3, 1977 [JP] Japan...............52/64900

--rather than--

[30]--Foreign Application Priority Data

Jun. 3, 1977 [JP] Japan...............52/64900

Nov. 1, 1977 [JP] Japan...............52/130288

Feb. 10, 1978 [JP] Japan...............53/13560 as it now appears.

Signed and Sealed this

Twenty-sixth Day of May 1981

[SEAL]

Attest:

RENE D. TEGTMEYER

Attesting Officer      Acting Commissioner of Patents and Trademarks